INVENTOR
JAMES M. MARTIN
ATTORNEYS

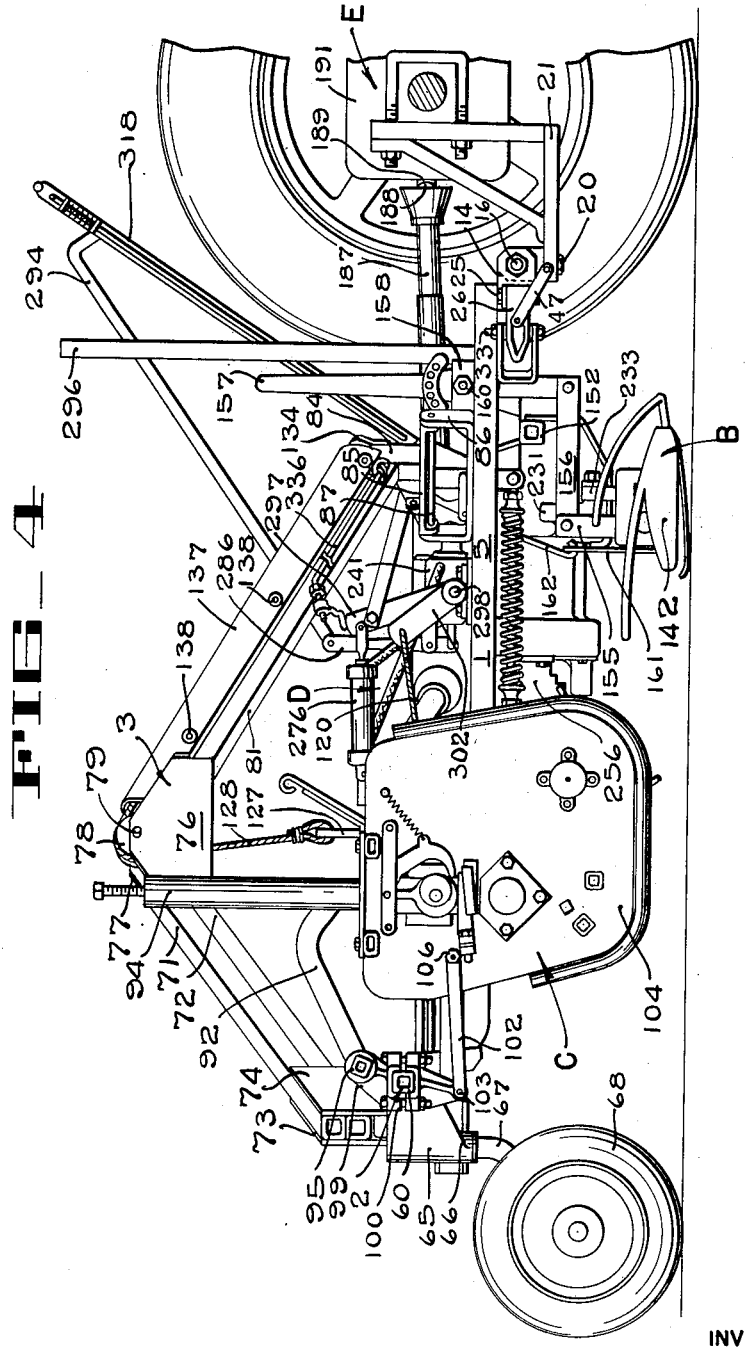

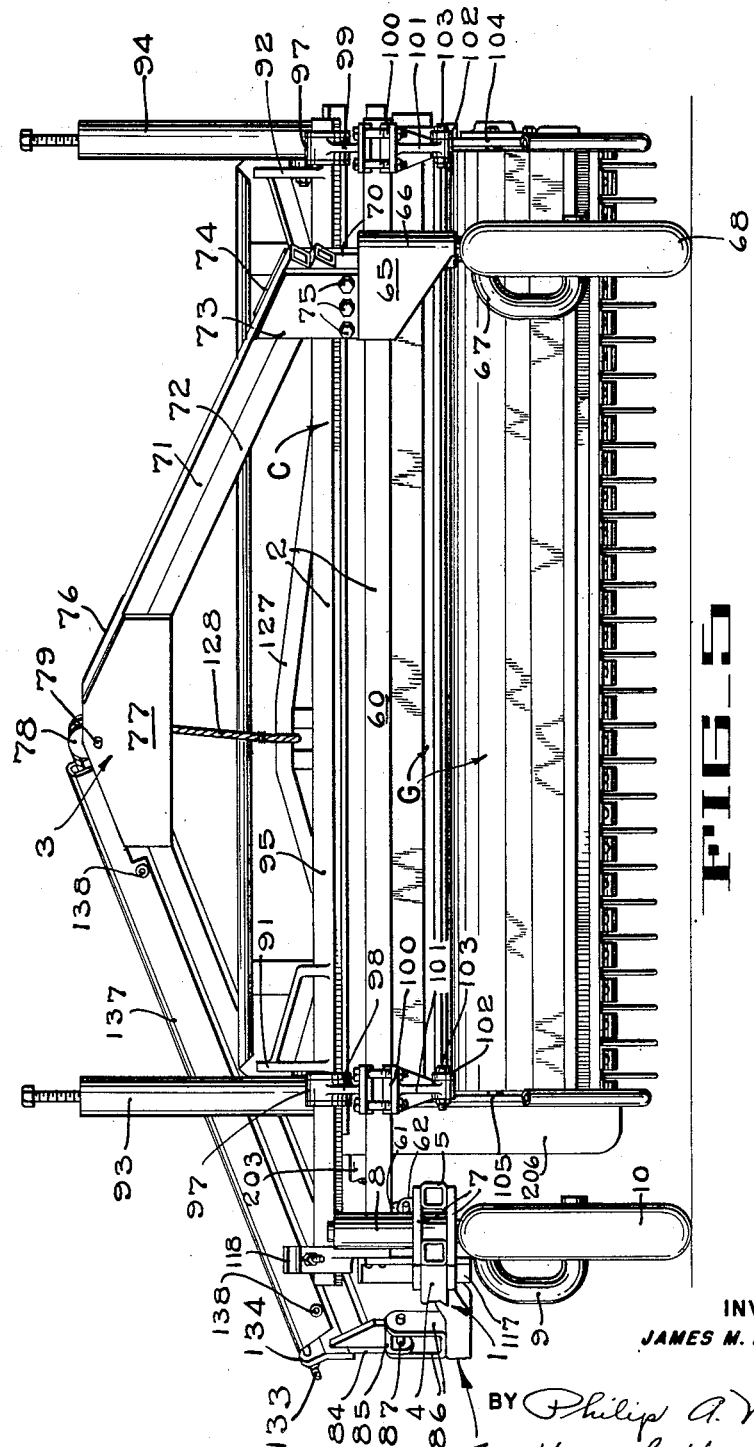

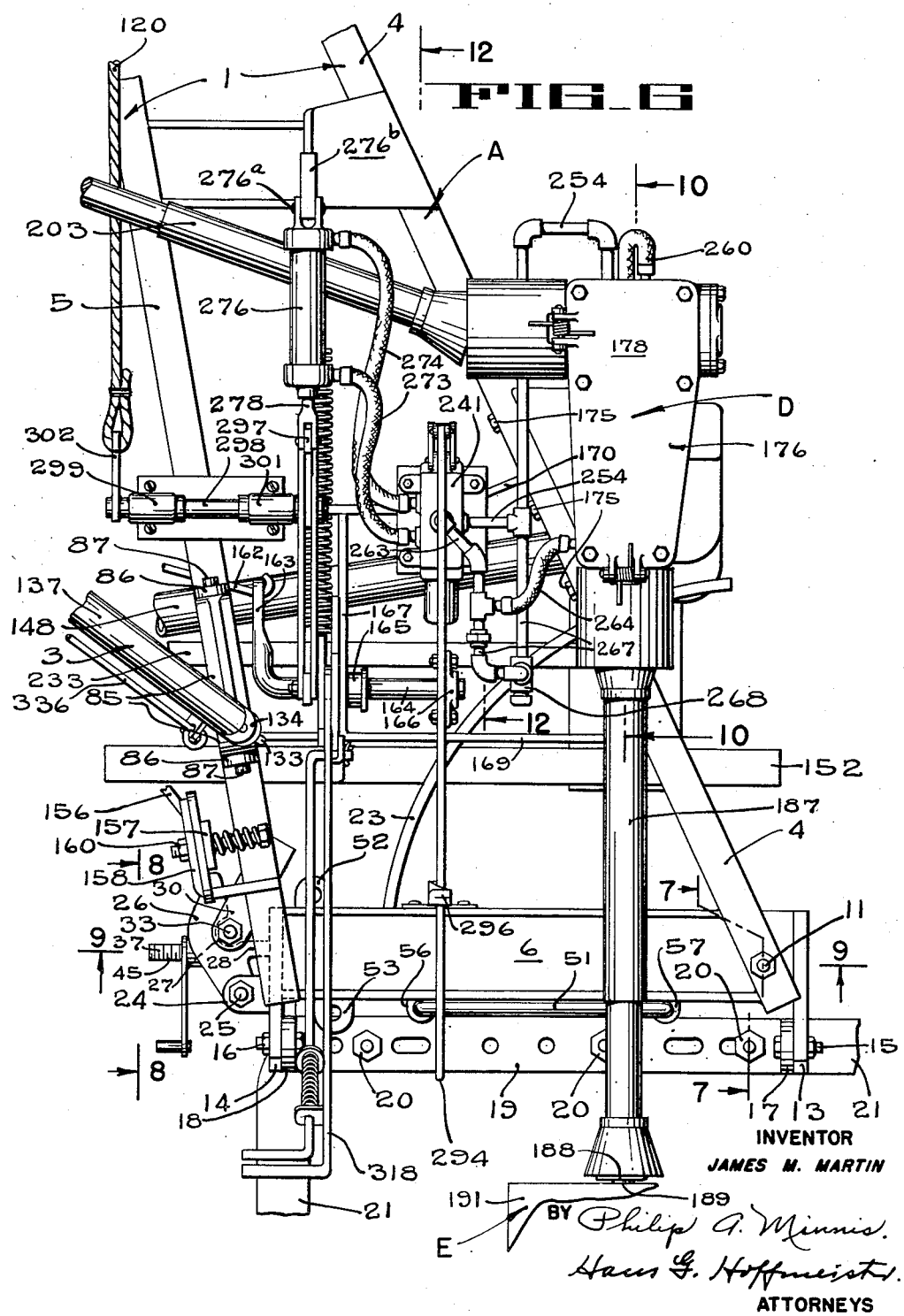

April 15, 1952 J. M. MARTIN 2,592,928
HARVESTING MACHINE WITH COUPLING MECHANISM TO A TRACTOR
Filed April 18, 1947 12 Sheets-Sheet 7
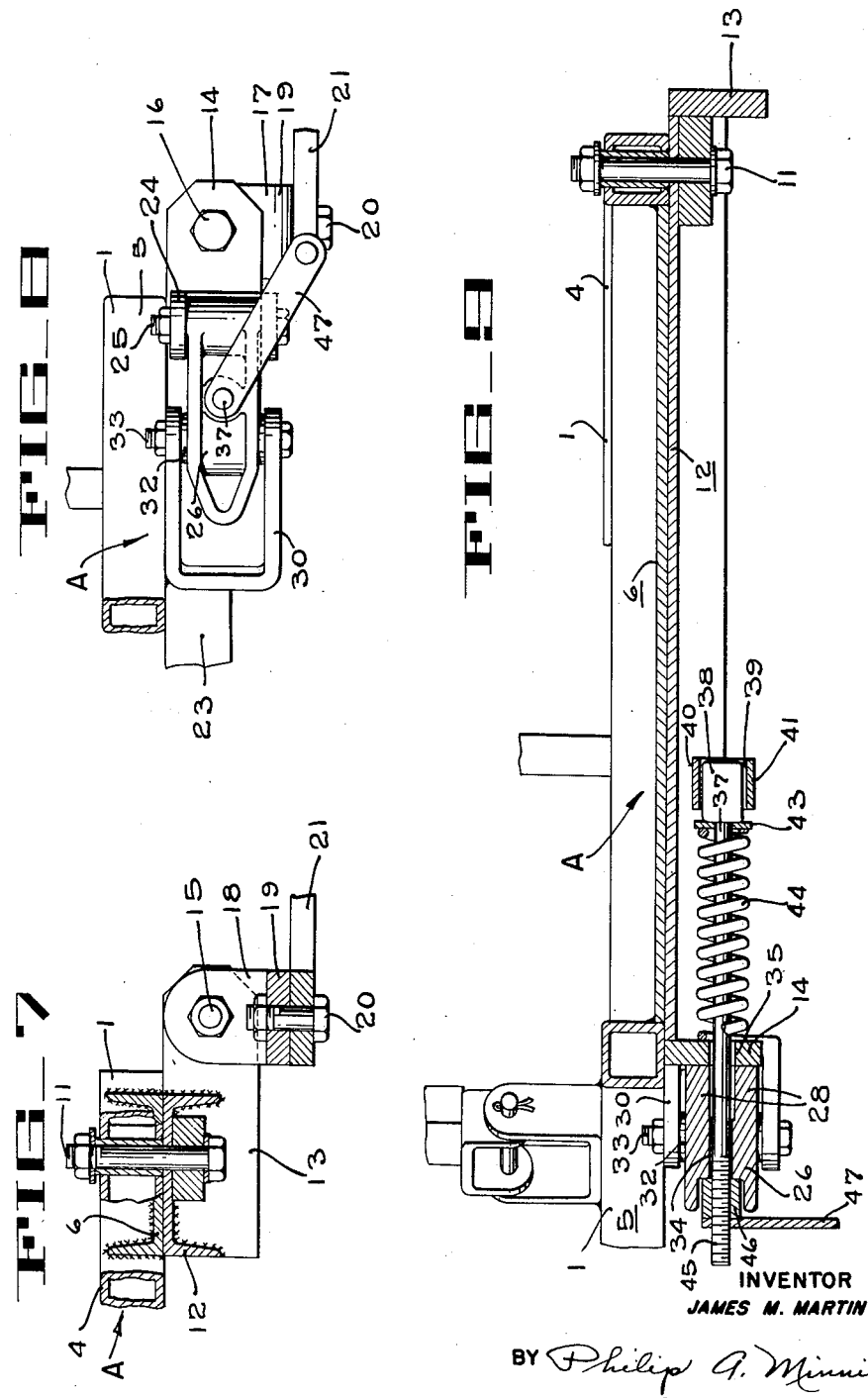
INVENTOR
JAMES M. MARTIN
BY Philip G. Minnis
Hans G. Hoffmeister
ATTORNEYS

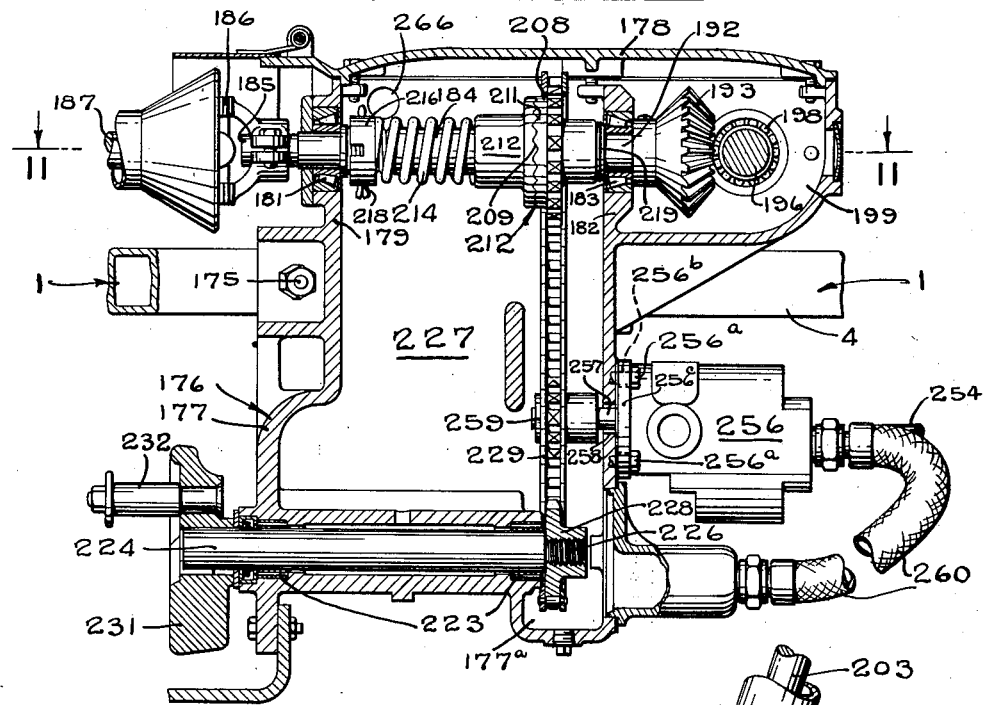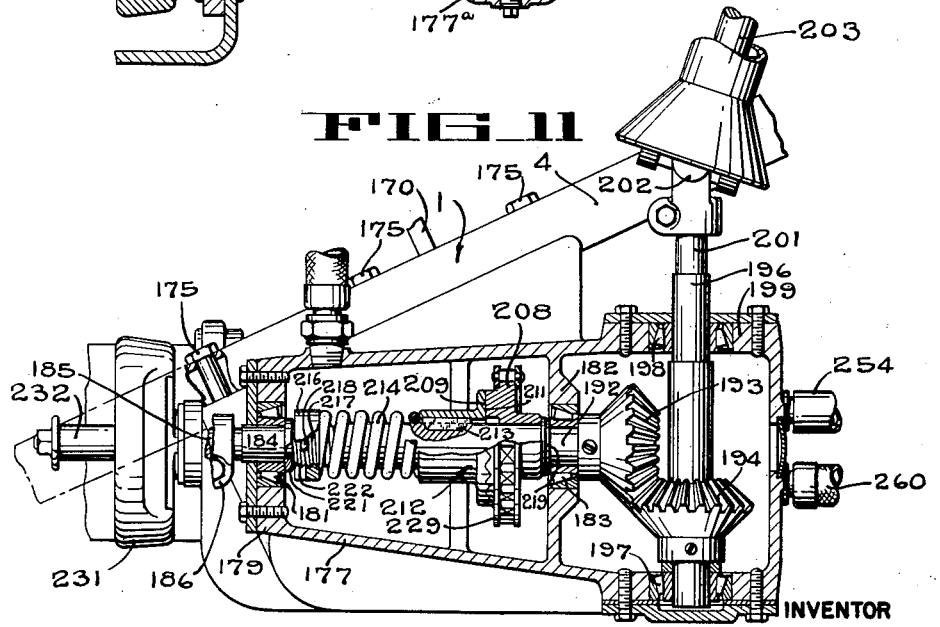

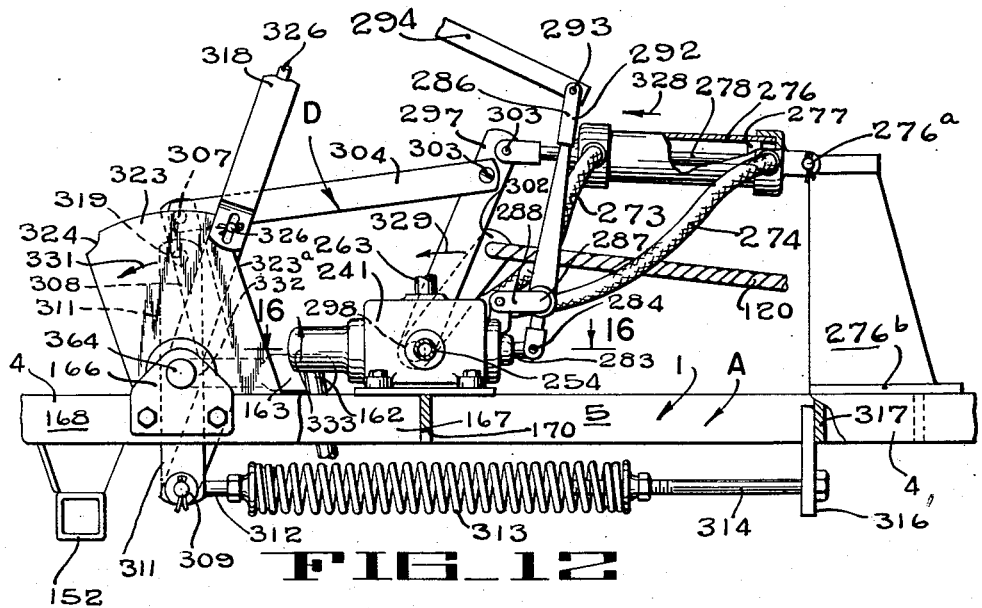
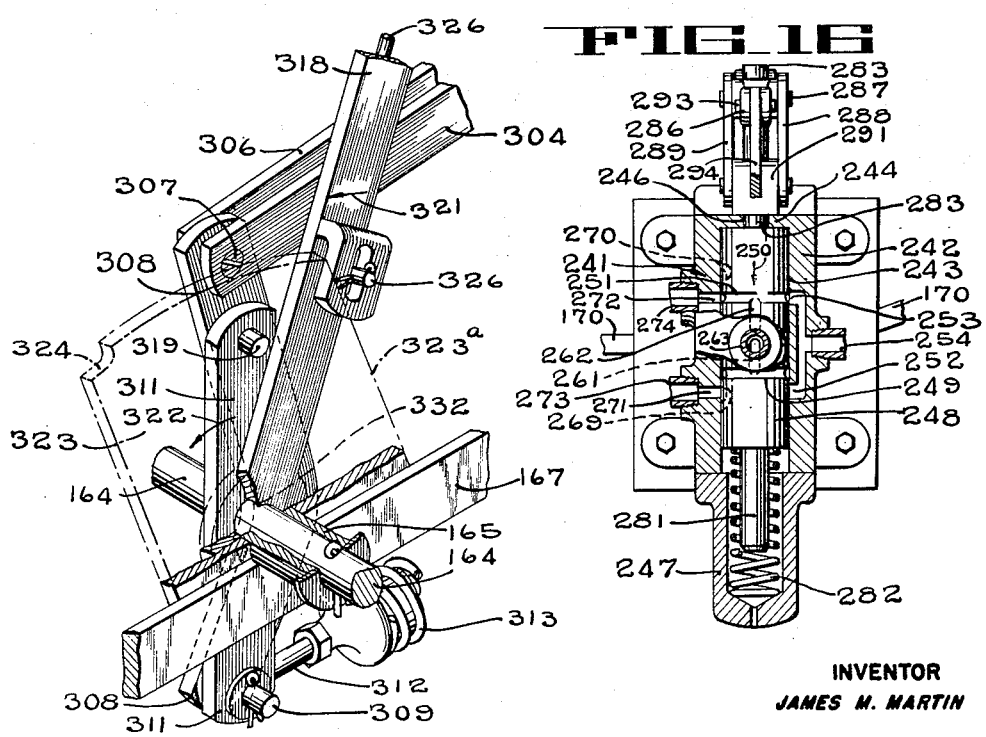

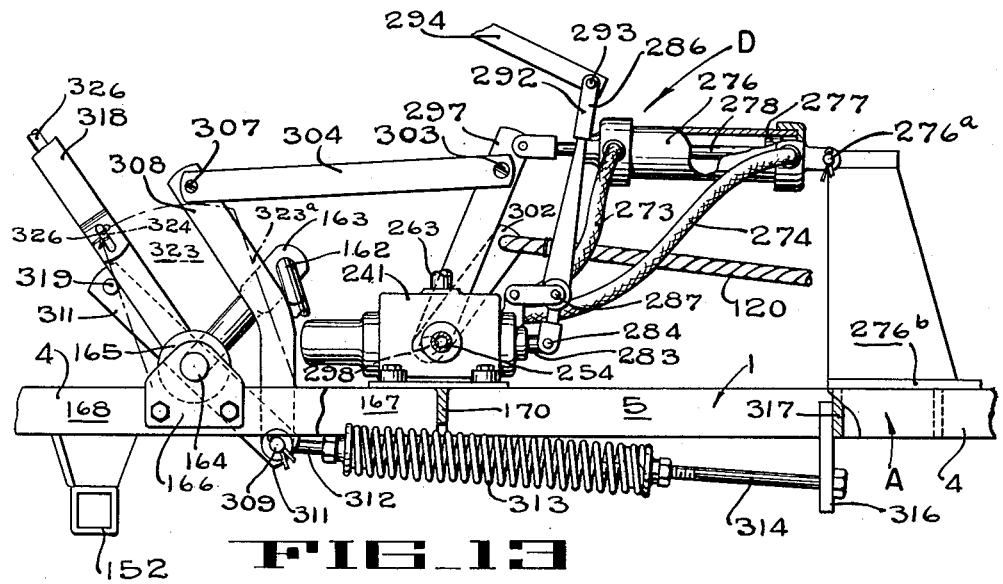
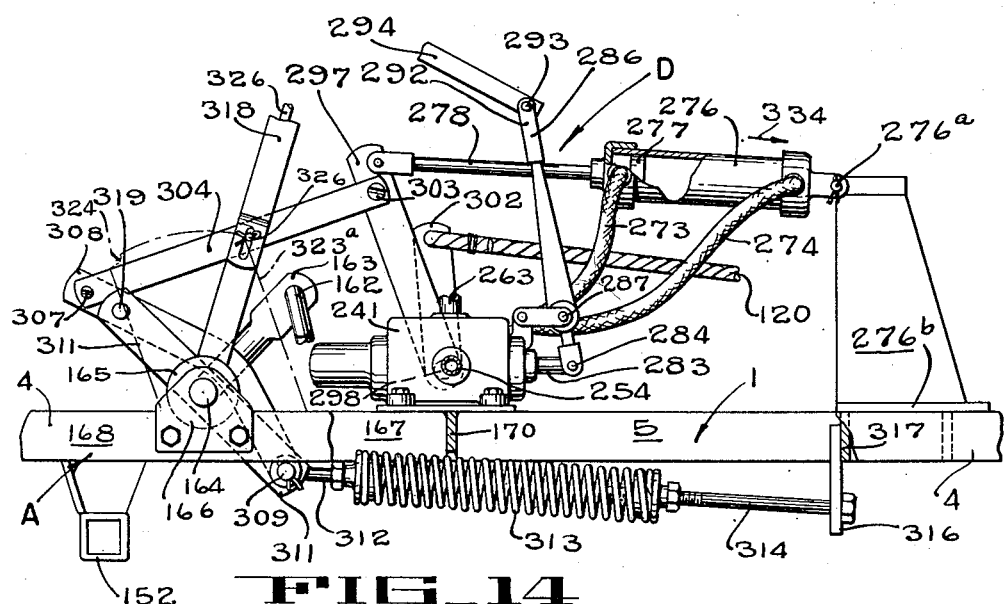

April 15, 1952    J. M. MARTIN    2,592,928
HARVESTING MACHINE WITH COUPLING MECHANISM TO A TRACTOR
Filed April 18, 1947    12 Sheets-Sheet 11
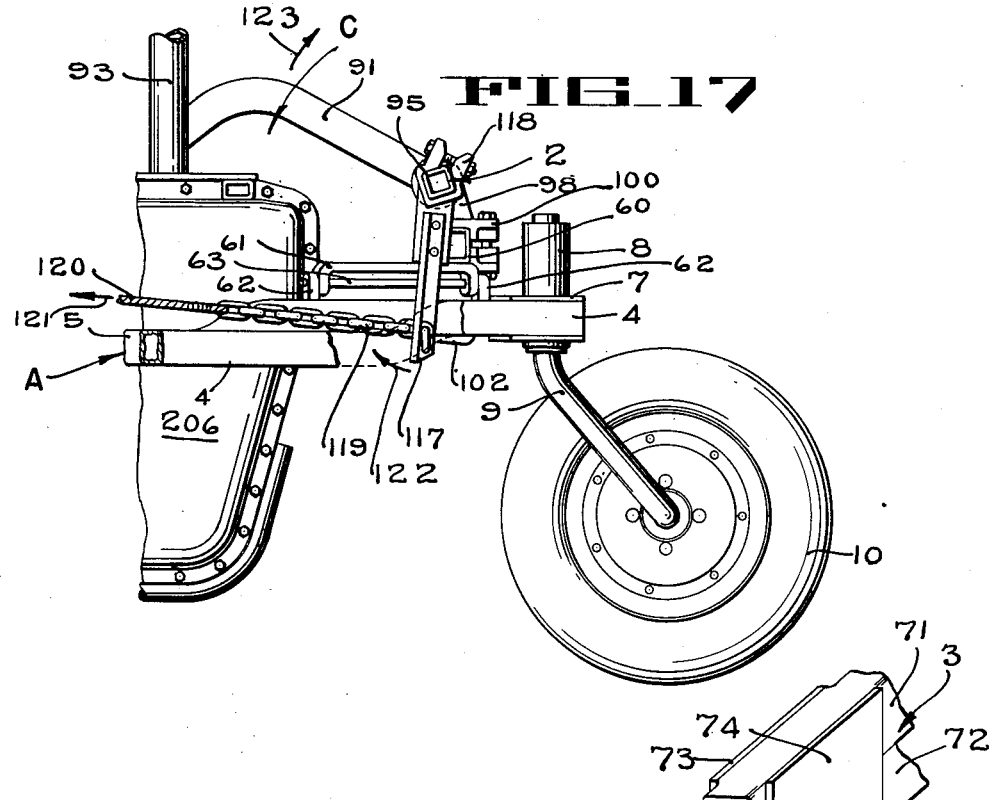
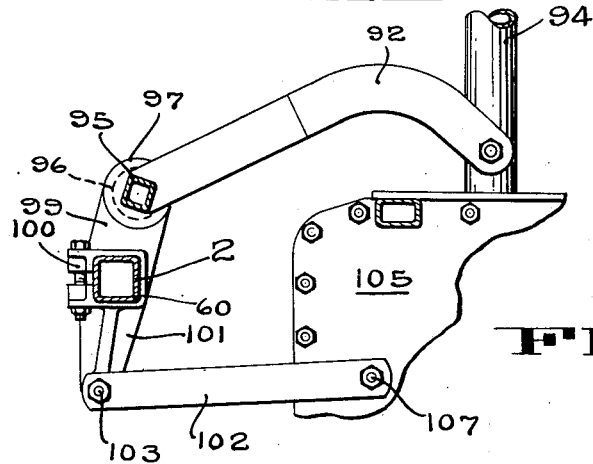
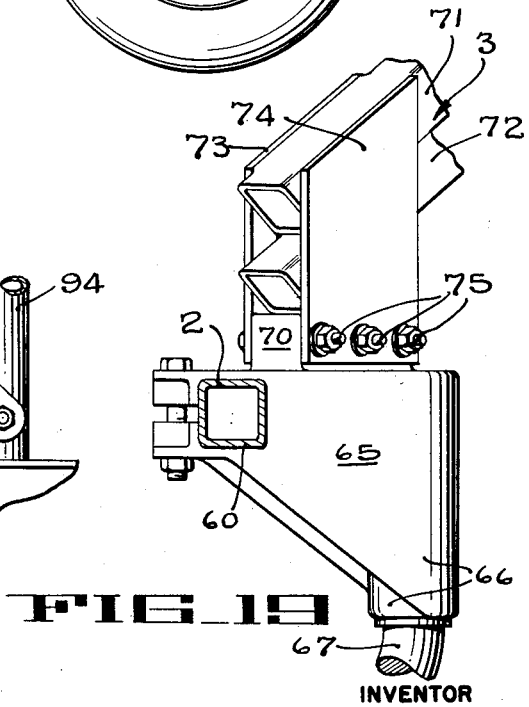
INVENTOR
JAMES M. MARTIN
BY Philip A. Minnis
Hans G. Hoffmeister
ATTORNEYS April 15, 1952   J. M. MARTIN   2,592,928
HARVESTING MACHINE WITH COUPLING MECHANISM TO A TRACTOR
Filed April 18, 1947   12 Sheets-Sheet 12
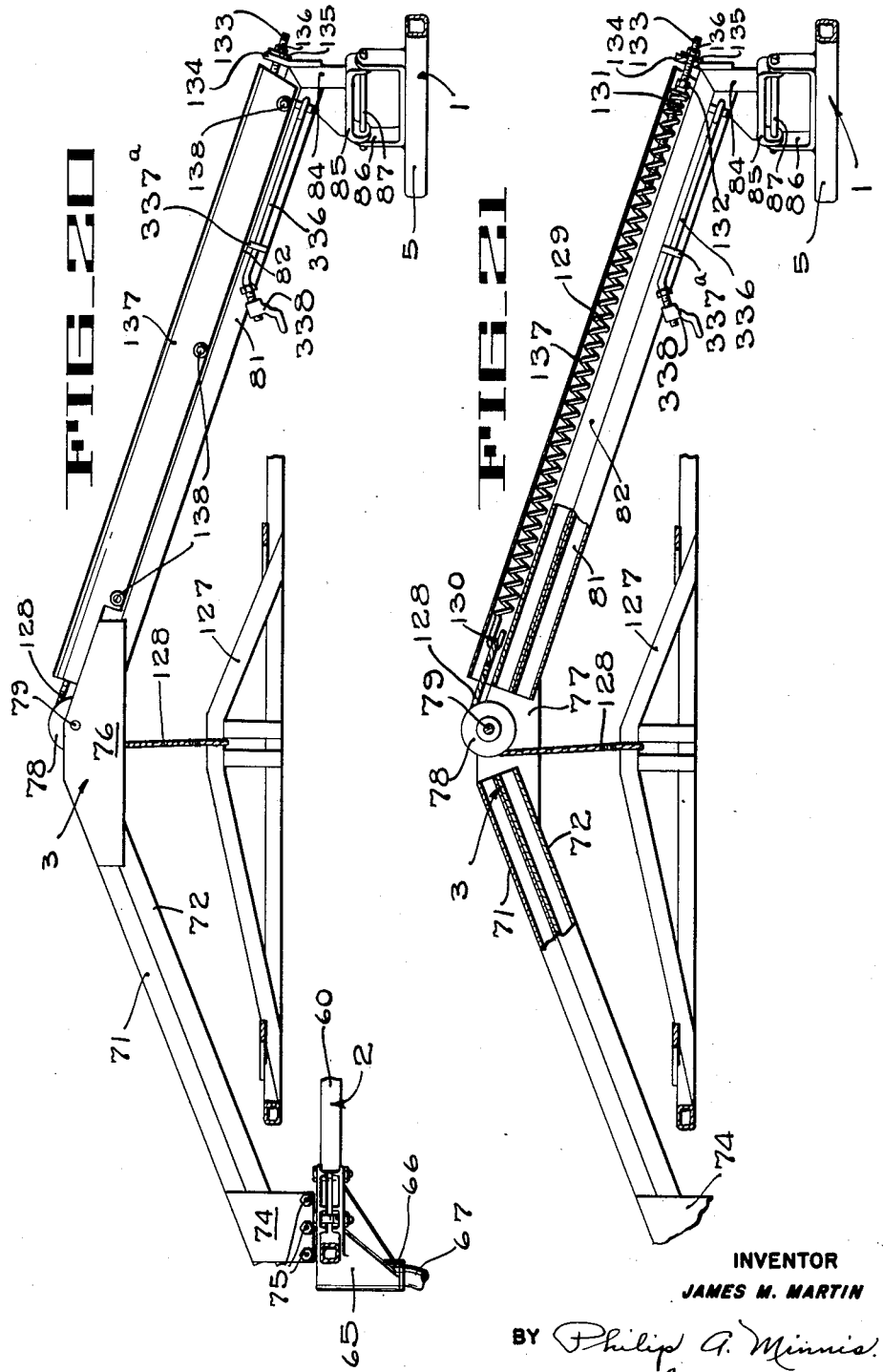
INVENTOR
JAMES M. MARTIN
ATTORNEYS Patented Apr. 15, 1952

2,592,928

UNITED STATES PATENT OFFICE 2,592,928

HARVESTING MACHINE WITH COUPLING
MECHANISM TO A TRACTOR

James M. Martin, Lansing, Mich., assignor to Food Machinery and Chemical Corporation, San Jose, Calif., a corporation of Delaware Application April 18, 1947, Serial No. 742,368

4 Claims. (Cl. 56—23)

The present invention relates to a harvesting machine for harvesting alfalfa hay, or the like.

One object of the present invention is to provide means for attaching a harvesting machine to a tractor for propulsion thereby either in working position with the crusher and mower units disposed at substantially right angles to the direction of travel of the tractor or in transporting position with the crusher and mower units angularly disposed in trail-behind relation relative to the tractor to reduce the overall width of the machine during transportation thereof.

Other and further objects and advantages of the present invention will become apparent from the following description and drawings in which:

Fig. 4 is a side elevation of the machine shown in Fig. 1 looking in the direction of arrows 4—4 thereof; a portion of the tractor being shown in section.

Fig. 5 is an enlarged rear view of the crusher unit and a portion of the frame of the machine taken in the direction of arrows 5—5 in Fig. 1.

Fig. 6 is an enlarged plan view of the frame and the control mechanism of the machine.

Fig. 7 is an enlarged section of a portion of Fig. 6 taken along line 7—7 thereof.

Fig. 8 is an enlarged side elevation of a portion of Fig. 6 looking in the direction of arrows 8—8 thereof.

Fig. 9 is an enlarged transverse section of Fig. 6 taken along line 9—9 thereof; certain portions being omitted.

Fig. 10 is an enlarged vertical and longitudinal section through the power transmission of the machine taken along line 10—10 of Fig. 6.

Fig. 11 is a horizontal section of Fig. 10 taken along line 11—11 thereof; certain parts being broken away while others are shown in elevation.

Fig. 12 is an enlarged side view of a portion of the mechanism for raising and lowering the mower and crusher units and the controls therefor; the view being taken along line 12—12 of Fig. 6.

Fig. 13 is a view similar to Fig. 12 illustrating the position of the various parts upon manual raising of the mower unit.

Fig. 14 is a view similar to Fig. 12 illustrating the position of the parts of the control mechanism upon simultaneous raising of the mower and crusher units.

Fig. 15 is a perspective view of some of the control and actuating levers shown in Fig. 12; certain parts being broken away while others are shown in dotted lines.

Fig. 16 is an enlarged horizontal section of the control valve of the machine taken along line 16—16 of Fig. 12.

Fig. 17 is an enlarged elevation of the rear end of the frame of the machine and certain parts of the crusher unit; the view being taken along line 17—17 in Fig. 1.

Fig. 18 is an enlarged section of a portion of Fig. 1 taken along line 18—18 thereof.

Fig. 19 is an enlarged section of a portion of Fig. 1 taken along line 19—19 thereof.

Fig. 20 is an enlarged side view of the truss bar assembly of the machine taken along line 20—20 of Fig. 1; a portion of the frame of the machine and portions of the crusher unit are shown in connection therewith.

Fig. 21 is a view similar to Fig. 20; certain parts being shown in section.

The harvesting machine of the present invention in general (Fig. 1) comprises a frame A, a mower unit B, a crusher unit C, and an actuating and control mechanism D. The mower unit B and the crusher unit C are connected to and supported by the frame A for travel therewith while the frame A, in turn, is connected to a tractor E, partially shown in Fig. 1, for propulsion thereby.

Figure 1:
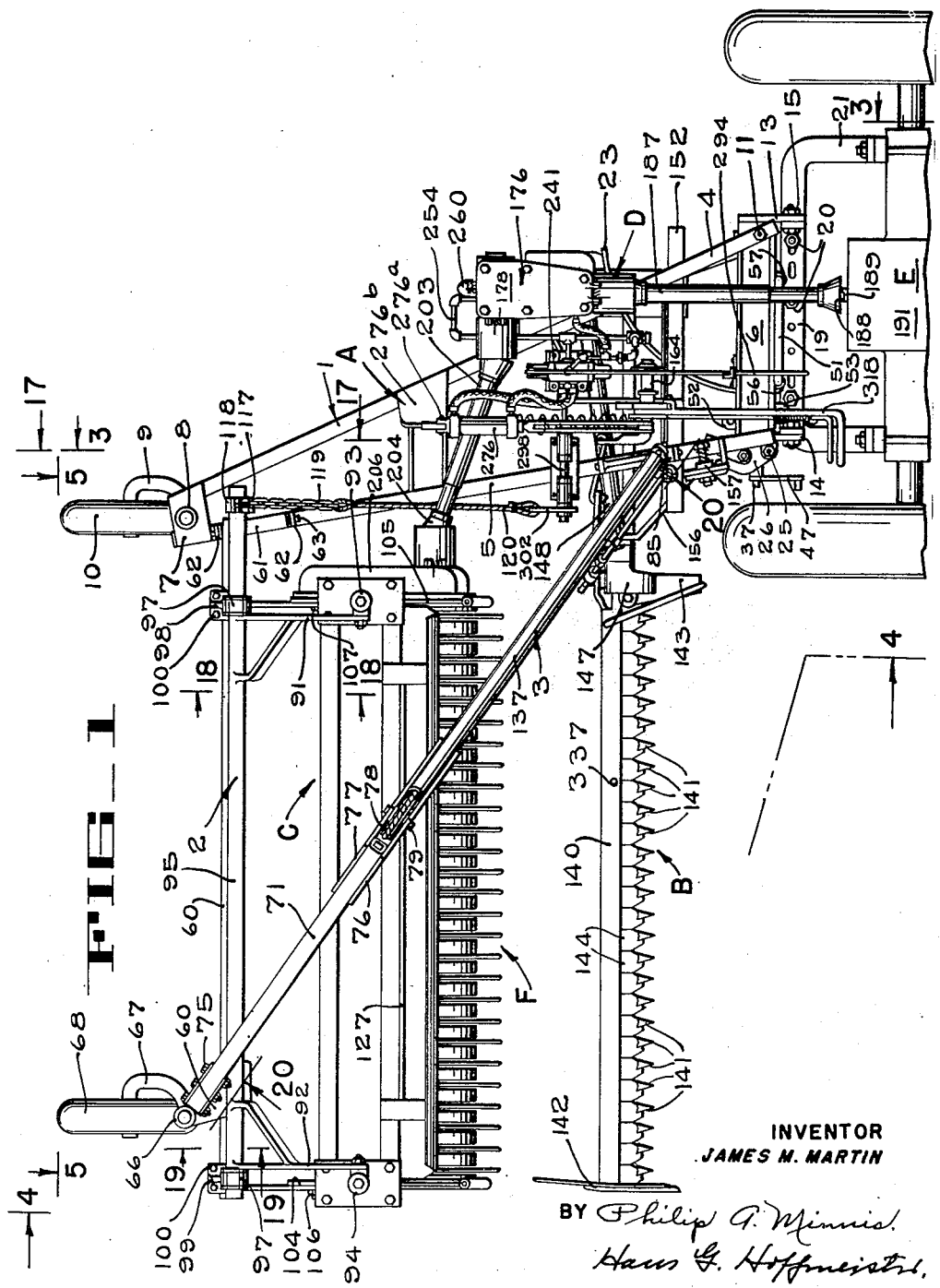
Fig. 1 is a plan view of the machine of the present invention and a portion of a tractor for propelling the same; the machine being shown in working position.

When the machine is in working position, as shown in Fig. 1, the mower unit B and the crusher unit C are disposed at right angles to the direction of travel of the tractor E and both units are operated and propelled over the ground by the tractor so as to effect cutting of the alfalfa by the mower unit B. The cut alfalfa is picked up from the field by a pick up mechanism F of the crusher unit C and is introduced thereby between presser rolls G (Fig. 5) of the crusher unit which crack the stems of the alfalfa and subsequently discharge the treated alfalfa at the rear end of the machine back onto the ground for subsequent drying.

When the machine is to be transported from one location to another, the operation of the mower unit B and the crusher unit C (Fig. 2) is discontinued and both units are raised to inoperative position. The mower unit is thereupon swung out of the way into substantially vertical position and the entire machine, i. e., the frame A, the mower unit B, and the crusher unit C, is swung into transporting position in which it is angularly disposed relative to the tractor E and is firmly secured in such position to the same so as to reduce the overall width of the machine during transportation thereof.

With the above general construction of the machine in mind, reference is first made to the frame structure A thereof which comprises a triangular main frame 1 (Fig. 1) an auxiliary frame 2, and a truss bar assembly 3. The frame 1 is formed by tubular side members 4 and 5 of rectangular configuration in cross section (Figs. 3 and 7 to 9, inclusive) welded at their front ends to a U channel 6 while the rear ends of the tubular members 4 and 5 are welded to a casting 7 provided with a vertically disposed bearing portion 8 within which the axle 9 of a supporting wheel 10 is rotatably mounted. The axle 9 is rotatably retained in the bearing 8 in any desired manner.

The front end of the side member 4 (Figs. 1, 6, 7, and 9) is pivotally secured by means of a bolt 11 to a U channel 12 provided with side bars 13 and 14 welded to the ends thereof and in turn pivotally connected by means of bolts 15 and 16 to vertically disposed portions 17 and 18, respectively, of a U-shaped hitch bar 19 fixed by means of bolts 20 to a draw bar 21 secured to the rear end of the tractor E in any convenient manner.

Figure 2:
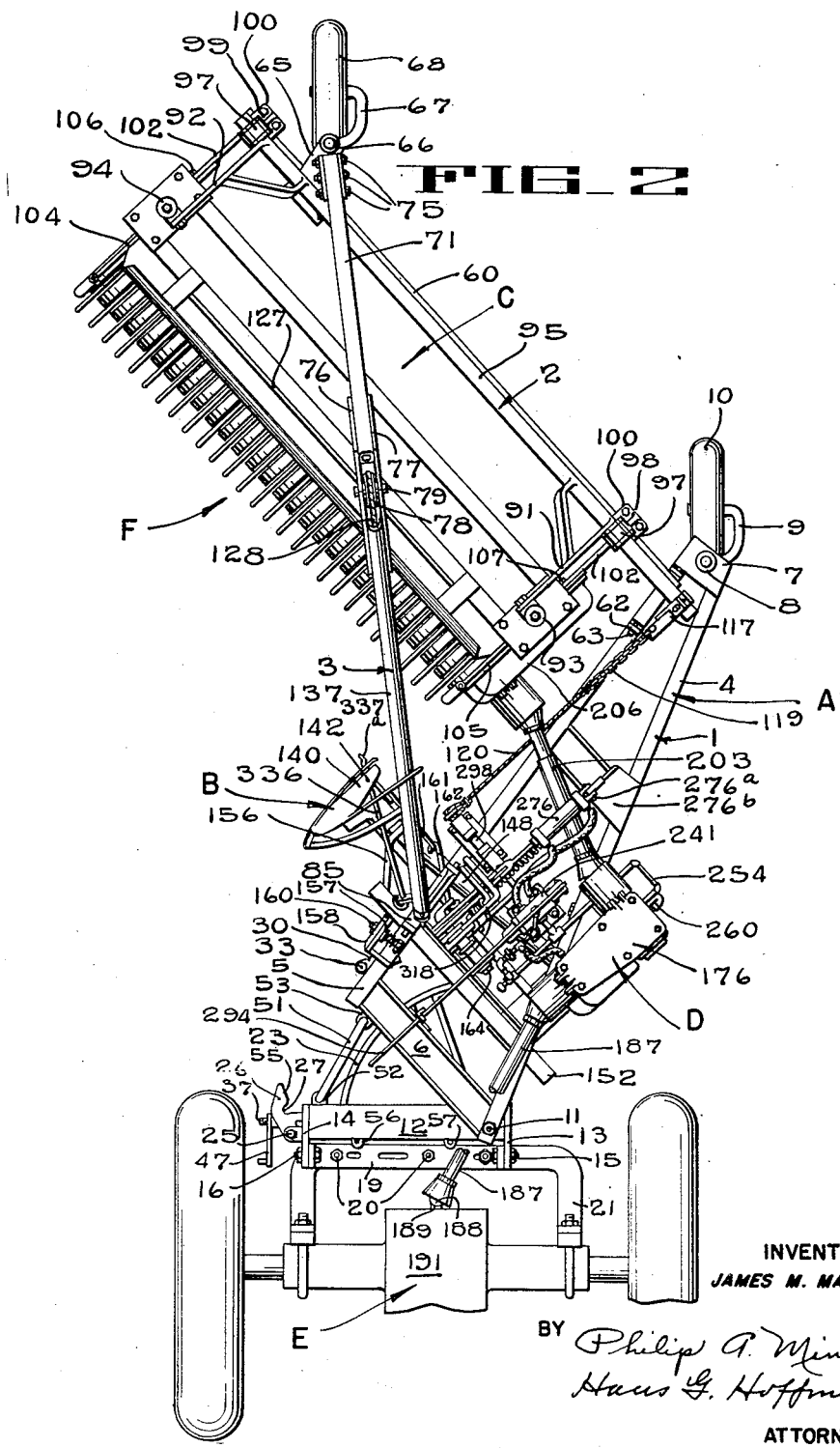
Fig. 2 is a plan view similar to Fig. 1 illustrating the machine in transporting position.

The U channels 6 and 12 are disposed with their flat web portions adjacent each other so as to permit lateral pivotal movement of the frame structure 1 about pivot bolt 11 from the position shown in Fig. 1 to the position illustrated in Fig. 2. Welded to the U channel 12 (Fig. 2) is an arcuate supporting bar 23 for supporting the U channel 6 during pivotal movement of the frame, as above described.

Secured to the side bar 14 is a U-shaped bracket 24 (Figs. 6 and 8) and pivotally mounted within the same by means of a bolt 25 is a latch 26. This latch is provided with a substantially semi-circular recess 27 and an extension 28 adapted to abut against side bar 14, previously referred to. Welded to the bottom of the frame member 5 is a U-shaped bracket 30 (Figs. 6, 8, and 9) provided with a tubular roller 32 rotatably mounted within the free ends of the bracket 30 by means of a bolt 33. Extending through an opening 34 in the latch 26 and an opening 35 in the side bar 14 is a rod 37, the rear end of which is provided with a bearing block 38 (Fig. 9) slidably disposed within a guideway 39 formed by straps 40 and 41 welded to the U channel 12. Disposed intermediate the side bar 14 and a washer 43 adjacent the bearing block 38 and surrounding the rod 37 is a coil spring 44. The outer end of the rod 37 is threaded, as shown at 45, and screwed upon the same is the interiorly threaded hub portion 46 of a crank handle 47.

To lock the frame structure A of the machine and the mower unit B and crusher unit C carried thereby against lateral pivotal movement in working position with respect to the tractor E, the frame 1 is swung about its pivot 11 until the roller 32 of the bracket 30 enters the semi-circular recess 27 of the latch 26 and thereupon the crank handle 47 is turned so as to screw the hub portion 46 thereof firmly against the latch 26 and to force the latch inwardly about its pivot 25 until the extension 28 abuts against the side bar 14 (Fig. 6). With the latch in this position the frame A is firmly locked in its working position against lateral movement with respect to the tractor, as shown in Fig. 1, but is free to pivot up and down relative to the same about the pivots 15 and 16, previously referred to. If it is desired to swing the frame A, mower unit B, and crusher C into transporting position, the crank 47 is turned in the direction opposite to that as heretofore described, whereby the latch 26 is released from locking engagement with the roller 32 and the frame 1 is free to swing from the position shown in Fig. 1 to the position illustrated in Fig. 2 when the tractor is driven slightly forward with the latch 26 in unlocked position. Thereupon the crank 47 is turned to move the latch 26 back into locking position, i. e., until the extension 28 thereof abuts against the side bar 14.

After the frame 1 has been unlocked and disposed in an angular position relative to the tractor, as shown in Fig. 2, a transport bar 51 having the end portions thereof bent to extend at right angles to the central portion thereof, has the bent end portions inserted into ears 52 and 53 on the U channels 12 and 6, respectively (Fig. 2), to secure the frame in this position.

If it is desired to dispose the mower unit B, crusher unit C, and the frame 1 into working position and to again lock the latter to the U channel 12, all that is necessary is to remove the transport bar 51 and to back up the tractor against the frame A until the roller 32 of the bracket 30 engages the cam surface 55 of the latch 26 and forces the same outwardly effecting a simultaneous outward movement of the rod 37 against the tension of the coil spring 44 until the sleeve 32 enters the semi-circular recess 27 and the latch 26 snaps back into locking position under the action of the coil spring 44. To subsequently release the frame structure again for pivotal movement into transporting position the same procedure, as outlined in the above is repeated. When not in use, the transport bar is carried by ears 56 and 57 on the front side of U channel 12 (Figs. 2 and 6).

The auxiliary or crusher unit supporting frame 2 (Figs. 1 to 5, 17 and 18) comprises a horizontally disposed tubular frame member 60 fixed to a U-shaped bracket 61 pivotally mounted to lugs 62 secured to the side member 5 of the triangular main frame 1 by means of a pivot rod 63. The other end of the tubular frame member 60 is provided with a casting 65 including a vertically disposed bearing portion 66 within which the axle 67 of a castor wheel 68 is pivotally mounted. The casting 65 is provided with a vertical projection 70 (Fig. 19) which is angularly disposed with respect to the tubular frame member 60 and to which the rear end of the truss bar assembly 3 is secured.

The truss bar assembly 3 (Figs. 1, 2, and 19 to 21) comprises parallel tubular members 71 and 72, the rear ends of which are welded to plates 73 and 74 which are firmly bolted to the vertical projection 70 of the casting 65 by means of bolts 75. The tubular members 71 and 72 extend forwardly of the casting 65 in upwardly inclined direction and the front ends of these tubular members are welded to gusset plates 76 and 77 within which a grooved pulley 78 is rotatably mounted by means of pivot shaft 79. Welded to the front portion of the gusset plates 76 and 77 are downwardly inclined tubular members 81 and 82 disposed in parallel relation adjacent each other and welded at their front ends to a bracket 84 provided with a U shaped portion 85 pivotally mounted within a U-shaped bracket 86 by means of a pivot rod 87. The bracket 86 is welded to the side member 5 of the main frame 1 in such a manner that the pivot rods 87 and 63 are disposed in axial alignment with respect to each other to thereby permit pivotal movement of the supporting frame 2, truss bar assembly 3, and crusher unit C vertically relative to the frame 1.

The crusher unit C (Figs. 1, 2, 5, 17, and 18) is adjustably mounted on the auxiliary or crusher unit supporting frame 2 by means of arms 91 and 92 pivotally secured to spring housings 93 and 94, respectively, of the crusher unit structure. The arms 91 and 92 are welded to, or form integral parts of, a tubular lift shaft 95 of rectangular configuration in cross section disposed parallel to and above the tubular frame member 60. The lift shaft 95 is provided with cylindrical bearing portions 96, only one of which is shown in Fig. 18, which are rotatably disposed within bearings 97 of brackets 98 and 99 fixed to the frame member 60 by means of a clamp portion 100.

Each of the brackets 98 and 99 (Figs. 5 and 18) comprises a downwardly extending bracket portion 101 to each of which a stabilizer bar 102 is pivotally secured at 103 while the other ends of each of the stabilizer bars 102 are pivotally secured to the end walls 104 and 105 of the crusher unit C by means of bolts 106 and 107, respectively.

Secured to the lift shaft 95 (Fig. 17) is an actuating lever 117 by means of a clamp 118 forming an integral part thereof. The actuating lever 117 extends downwardly from the bar 95 and secured to the lower end of the lever 117 is a chain 119 to which an actuating cable 120 is connected.

From the above it will, therefore, be seen that when the actuating lever 117, lift shaft 95, and arms 91 and 92 are in the position as shown in Fig. 17, the crusher unit C is disposed in its lowermost position. When the actuating cable 120 is pulled forward in the direction of arrow 121 (Fig. 17) the actuating lever 117 is swung in the direction of arrow 122 (Fig. 17) and the lift shaft 95 is turned clockwise whereby the arms 91 and 92 fixed thereto are swung upwardly in the direction of arrow 123 (Fig. 17) and the crusher unit C is raised vertically without tilting and, therefore, without change in angular position of the pick-up fingers relative to the ground from its lowermost or operative position, as shown in Figs. 4 and 17, to elevated or inoperative position (Fig. 3) with the pick-up fingers disposed at a predetermined distance above the ground.

Attached to the top of the crusher unit C (Figs. 1, 5, 20, and 21) is a supporting bar 127 extending transversely of the crusher unit C. Attached to the supporting bar 127 (Figs. 20 and 21) is a suspension cable 128 which is trained around the pulley 78 of the truss bar assembly 3 and secured to a coil spring 129 at 130 disposed above and parallel to the tubular member 82 of the truss bar assembly. The other end of the coil spring is attached to a sleeve 131 (Fig. 21) provided with an adjustment nut 132 threadedly secured to a rod 133 slidably disposed within a plate 134 welded to the bracket 84, previously referred to. A washer 135 and a nut 136 threadedly secured to the rod 133 and bearing against the plate 134 maintain the rod 133 in adjusted position relative to the plate 134 and hold the spring 129 under the desired tension so as to suspend the crusher unit C and reduce the weight thereof acting on the arms 91, 92. By turning the nut 136 the tension of the spring 129 may be adjusted as desired to take the load off arms 91, 92 and lift shaft 95 to floatingly suspend the crusher unit on the truss bar assembly with just enough load to keep the pick-up finger in contact with the cut alfalfa on the ground. The spring 129 (Fig. 21) is surrounded by a cover 137 secured to the tubular member 82 of the truss assembly 3 by means of screws 138.

Disposed adjacent the frame structure 1 in front of the pick-up mechanism F of the crusher unit C (Figs. 1, 3, and 4) is the mower unit B, previously referred to. This mower unit is of well known construction and comprises a cutter bar assembly 140 including a plurality of guards 141, an outer guide shoe 142, an inner guide shoe 143, and a reciprocating knife 144. The inner guide shoe 143, to which the inner end of the cutter bar 140 is fixed, is pivotally connected at 145 and 146 to a yoke 147, which in turn is pivotally mounted on a drag bar 148, the other end of which is pivotally secured to the transmission housing of the actuating and control mechanism D.

Pivotally secured to an upstanding portion 155 of the yoke 147 is a link 156, the other end of which is pivotally secured to the lower end of a control lever 157 in turn pivotally mounted on the bracket 158 of the side member 5 by means of a pivot bolt 160. The control lever 157 and bracket 158 are provided with any appropriate means for maintaining the lever 157 in desired positions of adjustment whereby any desired pitch of the cutter bar 140 is obtained.

The inner guide shoe 143 includes an upstanding portion 161 to which a control rod 162 is pivotally connected. The free end of the rod 162 is pivotally connected to a crank 163 (Fig. 6) of a crank shaft 164 rotatably mounted within bearings 165 and 166 fixed to longitudinally extending braces 167, 168 in turn secured to transverse braces 169 and 170 of the frame structure 1. The control rod 162 is adapted to raise or lower the cutter bar assembly 140 in a manner as will be more specifically referred to later on.

Secured to the tubular side member 4 of the frame structure 1 by means of bolts 175 (Figs. 6, 10, and 11) is a power transmission unit 176 which comprises a casing 177 provided with a removable cover 178. Rotatably mounted within the front wall 179 by means of a tapered roller bearing 181 and within a partition wall 182 of the casing 177 by means of a tapered roller bearing 183 is a transmission shaft 184. The front end 185 of the transmission shaft 184 projects from the casing 177 at the front end thereof and secured to the same by means of a universal joint 186 is a telescoping drive shaft 187 (Fig. 10), the other end of which is connected by a universal joint 188 (Figs. 1 and 6) to the power take off shaft 189 of a power take off unit 191 of the tractor E.

Fixed to the rear end 192 (Figs. 10 and 11) of the transmission shaft 184 is a bevel gear 193 which meshes with a bevel gear 194 fixed to a transverse shaft 196 rotatively mounted within tapered roller bearings 197 and 198 mounted within the upper rear portion 199 of the transmission casing 177. The end 201 of the transverse shaft 196 projects from the casing portion 199 and is connected by a universal joint 202 to a telescoping crusher unit drive shaft 203, which in turn is connected by means of a universal joint 204 (Fig. 1) to the drive shaft of the crusher unit transmission, not shown, disposed within the crusher transmission housing 206.

The crusher unit transmission shaft is operatively connected with the presser rolls G and the pick-up mechanism F in any convenient manner, such as, for instance, shown in Patent No. 2,345,175 to R. H. Reed for Agricultural Apparatus, dated April 4, 1944, so that upon rotation of the shafts 196 and 203 the pick-up mechanism F and the presser rolls G of the crusher unit C are operated so that the fingers of the pickup mechanism F pick up the cut alfalfa and introduce the same between the presser rolls G which crack the stems of the alfalfa and subsequently discharge the treated alfalfa back onto the ground at the rear end of the crusher unit C.

The construction of the pick-up mechanism F, the presser rolls G, and the actuating and control mechanism associated therewith may be of any conventional design, such as, for instance, disclosed in Patent No. 2,345,175, above referred to.

Mounted for free rotation upon the shaft 184 (Figs. 10 and 11) is a sprocket 208 provided with a serrated clutch face 209 engaged by a complemental serrated face 211 of a clutch member 212 slidably mounted on the shaft 184 and rotatively connected therewith by means of a key and slot arrangement 213. The clutch member 212 is held with its clutch face 211 in engagement with the clutch face 209 of the sprocket 208 by means of a coil spring 214 encompassing the shaft 184 and disposed between the clutch member 212 and a collar 216 screwed on a threaded portion 217 of the shaft 184 and held in adjusted position by means of a cotter pin 218. Axial movement of the sprocket 208 away from the clutch member 212 is prevented by a collar 219 of the shaft 184. A bearing retaining collar 221 (Fig. 11) is disposed between a shoulder 222 of the threaded section of the shaft and the bearing 181, previously referred to.

Rotatably mounted below and parallel to the shaft 184 on roller bearings 223 within the casing 177 is a mower drive shaft 224. One end of this shaft is threaded, as shown at 226 (Fig. 10), and extends into the compartment 227 of the casing. Screwed on the threaded end 226 of shaft 224 and firmly fixed thereto against removal is a sprocket 228 and trained around the same and the sprocket 208 is an endless sprocket chain 229. The other end of the shaft 224 projects from the casing 177 and keyed to the same is a disk 231 provided with a crank pin 232. A pitman 233 (Figs. 1 and 6) pivotally connected to the crank pin 232 and the mower knife 144 effects reciprocation of the latter upon rotation of the shaft 224.

The tension of the coil spring 214 is so adjusted by turning the collar 216 after removal of the cotter pin 218 that the clutch faces 209 and 211 of the sprocket 208 and clutch member 212, respectively, are normally held in driving engagement whereby upon rotation of shaft 184, shaft 224 is rotated to effect reciprocation of the knife 144. However, in the event the knife 144 strikes an obstruction or jams due to a foreign object caught between the guards 141 and knife 144, the clutch face 211 is free to disengage from the clutch face 209 while the clutch member 212 is shifted against the tension of the coil spring 214 so that the drive of the shaft 224 is automatically interrupted whereby damage to the mower knife 144 and the drive mechanism thereof is prevented.

Mounted on the transverse brace 170 of the frame structure 1 adjacent the power transmission unit 176 (Figs. 1, 6, and 16) is a control valve 241 which comprises a housing 242 having a cylindrical bore 243. One end of the housing 242 is closed by a rear wall 244 provided with a bore 246 while the front end of the housing is closed by a cap 247. Slidably disposed in the bore 243 of the housing 242 is a piston valve 248 provided with spaced annular grooves 249 and 251 in its periphery adapted to alternately register with the inlet ports 252 and 253, respectively, of the housing 242. Connected to the housing 242 and communicating with both inlet ports 252 and 253 thereof is a suply conduit 254 in communication with the discharge port of a pump 256 (Fig. 10) adjustably secured to the power transmission casing 177 by cap screws 256ª extending through a horizontally elongated opening 256ᵇ of the flange 256ᶜ of the pump. The pump 256, which may be of any desired construction, includes a drive shaft 257 which projects through a bore 258 of the casing 177 into the compartment 227 and carries a sprocket 259 fixed thereto. The sprocket 259 engages the sprocket chain 229 so that upon operation of the sprocket 208 and chain 229 the pump 256 is simultaneously driven therewith. This sprocket 259 serves also as a chain tightener since, by loosening cap screws 256ª and shifting the pump laterally, the sprocket 259 is correspondingly shifted to thereby take up any slack of the chain 229. The inlet port of the pump 256 (Fig. 10) is connected by a conduit 260 with the lowermost portion or sump 177ª of the casing 177.

The piston valve 248 (Fig. 16) is further provided at its periphery with longitudinally extending grooves 261 and 262 which are in communication with the annular grooves 249 and 251, respectively. These grooves 261 and 262 are adapted to alternately register with a return conduit 263 (Figs. 6 and 16) connected by a flexible conduit 264 to an inlet port 266 (Fig. 10) in the upper portion of the casing 177, while a by-pass valve 268 and conduits 267 connect the return conduit 263 with the supply conduit 254.

The piston valve 248 is further provided with longitudinal grooves 269 and 270 extending from the annular grooves 249 and 251 for establishing continuous communication thereof with ports 271 and 272, respectively, of the housing 242 from which flexible conduits 273 and 274, respectively, lead to a hydraulic actuating cylinder 276 (Figs. 12, 13, and 14) within which a piston 277 provided with a piston rod 278 is slidably disposed. The conduit 273 is in communication with the front end of cylinder 276 while the conduit 274 is in communication with the rear end of the cylinder 276 which is pivotally mounted at 276ª on a supporting bracket 276ᵇ secured to frame member 4 (Figs. 6 and 13).

The front end of the piston valve 248 (Fig. 16) is provided with a spring retaining rod 281 and surrounding the same and interposed between the cap 247 and piston valve 248 is a coil spring 282 which normally holds the piston valve in the position shown in Fig. 16. Connected to the rear end of the piston valve 248 is an actuating rod 283 which projects through the bore 246 of the rear wall 244 of the housing 242 and the free end of which is pivotally connected at 284 (Fig. 13) to an actuating lever 286 fulcrumed at 287 to links 288 and 289 in turn pivotally connected to a boss 291 forming an integral part of the valve housing 242. The free end 292 of the lever 286 is pivotally connected at 293 to a control rod 294 which extends forward of the frame structure 1 (Fig. 6) and is slidably supported in a bracket 296 fixed to the U channel 6.

Pivotally connected to the free end of the piston rod 278 (Figs. 6 and 12 to 14) is a lever 297 fixed to a shaft 298 rotatably mounted in bearings 299 and 301 secured to the frame member 5 and transverse brace 170. Fixed to the shaft 298 is further a crank lever 302 to which the cable 120, previously referred to, is connected.

Pivotally connected to the lever 297 (Figs. 12 to 15) at 303 are actuating links 304 and 306, the other ends of which are pivotally connected at 307 to a link 308, in turn pivotally connected at 309 to a lever 311 fixed to the crank shaft 164. The link 308 is bent so that the same contacts the crank shaft 164 when the parts are in the positions shown in Fig. 14, but swings free of the crank shaft 164 when the parts are in the position shown in Fig. 13. Pivotally connected at 309 to link 308 and lever 311 is further a rod 312 to which one end of a coil spring 313 is secured. The other end end of the spring 313 is adjustably secured to a long bolt 314 mounted on a bracket 316 in turn fixed to a transverse brace 317 of the frame structure 1.

Freely pivotally mounted on the crank shaft 164 is a manual control lever 318 (Figs. 6 and 12 to 15) for manually raising and lowering the mower unit. A pin 319 (Fig. 15) fixed to the free end of lever 311 establishes an operating connection between levers 318 and 311 so that upon forward movement of the control lever 318 in the direction of arrow 321 (Fig. 15) the control lever 318 engages the pin 319 and effects rotation of the lever 311 and crank shaft 164 in the direction of arrow 322 (Fig. 15). This operating connection between the control lever 318 and lever 311, however, permits rotation of the lever 311 and crank shaft 164 in the direction of arrow 322 (Fig. 15) independent of the control lever 318, as clearly shown in Fig. 14 and more fully explained later on.

A quadrant 323 (Figs. 6, 12, and 15) provided with a notch 324 is fixed to the longitudinal brace 167 and the lever 318 is provided with a spring actuated locking rod 326 adapted to engage with the notch 324 when the lever 318 is in its foremost position (Fig. 13) and with the side 323ª of the quadrant when lever 318 is in its rearmost position, so as to firmly lock the lever 318 in said position.

The casing 177 of the transmission unit 176 is filled with lubricating oil which also serves as hydraulic actuating fluid for the piston 277. The level of the oil in the transmission casing is, therefore, maintained sufficiently high to supply the necessary amount of actuating fluid and to provide sufficient lubricant for the transmission mechanism.

From the above it is apparent that upon operation of the transmission shaft 184 (Fig. 10), sprocket 208, and sprocket chain 229, the sprocket 259 is simultaneously driven therewith effecting operation of the pump 256 whereby lubricant is withdrawn from the casing 177 through conduit 260 and is forced through conduit 254 into the inlet ports 252 and 253 (Fig. 16) of the control valve housing 242. It will, therefore, be seen that when the manual control lever 318 is disposed in its rearmost position, as shown in Fig. 12, and the control rod 294 is shifted to its foremost position, as illustrated in Fig. 14, the piston valve 248 is shifted by the actuating lever 286 from its position in Fig. 12 to its rearmost position, as shown in Figs. 14 and 16. In this position the annular groove 251 establishes communication between the inlet port 253, port 272, and conduit 274 while the inlet port 252 is closed by the piston valve 248. At the same time the conduit 273 and port 271 are brought in communication with the return conduit 263 by means of the valve passages 269, 249, and 261. Consequently, the hydraulic fluid forced through the conduit 254 and passage 253 is admitted through the conduit 274 into the cylinder 276 at the rear end thereof and forces the piston 277 from its rearmost position in the direction of arrow 328 (Fig. 12) to its foremost position illustrated in Fig. 14.

As the piston 277 is forced from its position shown in Fig. 12 to the position illustrated in Fig. 14 the hydraulic fluid in front of the piston 277 is discharged from cylinder 276 through conduit 273, port 271, valve passages 269, 249, 261, return conduits 263, 264, and inlet 266 back into the transmission casing 177. As soon as the piston 277 arrives at its foremost position, the hydraulic pressure in the conduit 274 and cylinder 276 under the continuous operation of the pump 256 increases and as soon as the pressure exceeds the pressure for which the by-pass valve 268 is set, the same opens and the fluid is by-passed from conduit 254 over conduits 267 and 264 back into the transmission housing 177.

The forward movement of the piston 277 in the direction of arrow 328 (Fig. 12) effects a corresponding forward movement of piston rod 278 and links 304 and 306, as well as a pivotal movement of lever 297, and link 308 in the direction of arrows 329 and 331, respectively, (Fig. 12) from their positions shown in Fig. 12 to their positions illustrated in Fig. 14.

Figure 3:
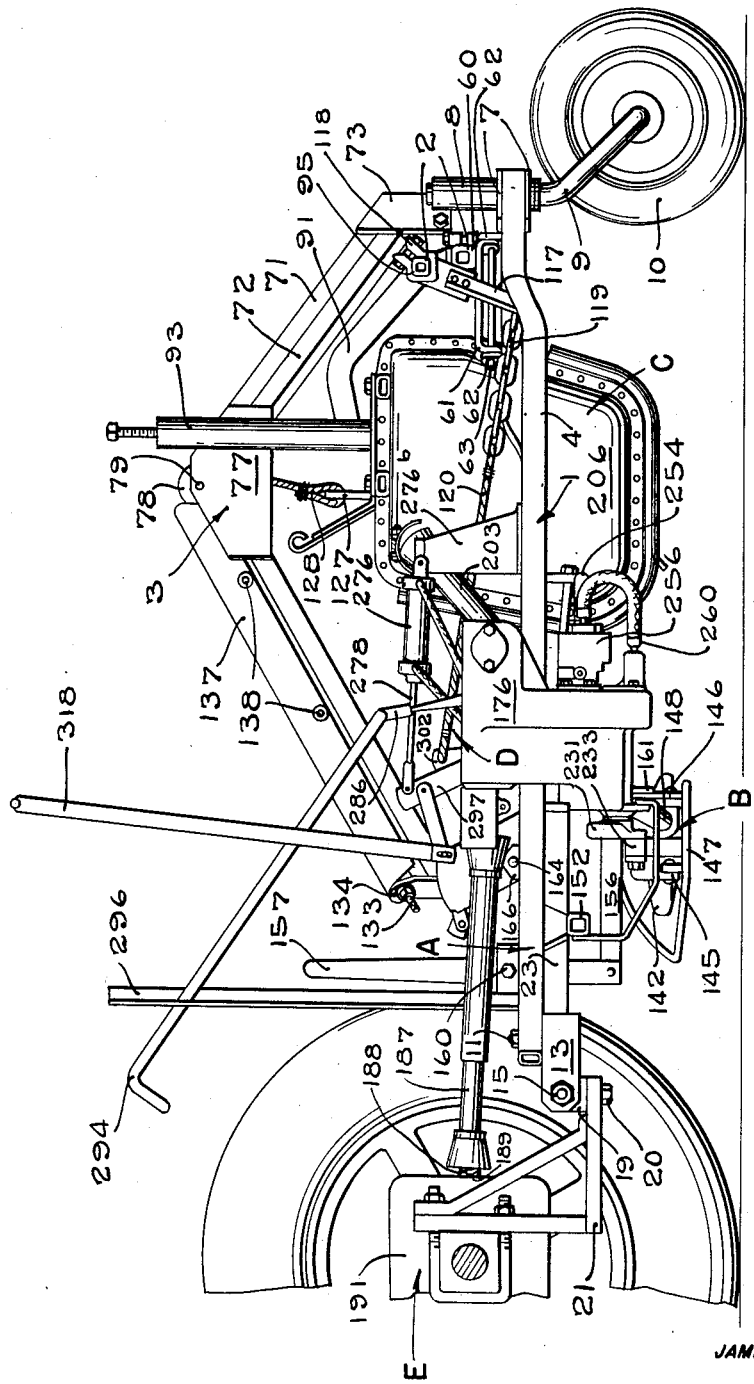
Fig. 3 is a side elevation of the machine shown in Fig. 1 looking in the direction of arrows 3—3 thereof; a portion of the tractor being shown in section.

The pivotal movement of the lever 297 effects a corresponding rotation of the shaft 298 and turning of the crank lever 302 from the position shown in Fig. 12 to the position illustrated in Fig. 14 whereby a forward pull on the cable 120 and chain 119 (Figs. 6 and 17) is exerted and the actuating lever 117 is swung in the direction of arrow 122 (Fig. 17) from its position shown in Fig. 17 to its position illustrated in Fig. 3 whereby the lift shaft 95 is turned in clockwise direction (Fig. 17) and arms 91 and 92 are swung upwardly in the direction of arrow 123 (Fig. 17) and the crusher unit C and pick-up mechanism F thereof are raised from operative to inoperative position (Fig. 3) in the manner as previously explained herein.

Upon actuation of the link 308, i. e., pivotal movement thereof in the direction of arrow 331, as above described, the curved center portion 332 thereof (Fig. 12) is brought into contact with the crank shaft 164 while the link 308 initially pivots about pivot 309 (Fig. 15) and thereupon while the center portion 332 of the link 308 bears against the crank shaft 164, which now serves as a fulcrum, the link 308 pivots about said crank shaft 164 whereby, due to the pivotal connection between link 308 and lever 311, as shown at 309, and the rigid connection between lever 311 and crank shaft 164, the lever 311 is rotated from its position shown in Figs. 12 and 15 to its position shown in Fig. 14 effecting a corresponding rotation of crank shaft 164. The rotation of the crank shaft 164 effects a corresponding turning of the crank 163 in the direction of arrow 333 from its position shown in Fig. 12 to its position illustrated in Fig. 14 whereby the mower unit B is raised from its operative position (Fig. 4) to its inoperative position (Fig. 3) by means of rod 162.

When the control rod 294 is shifted from its foremost position illustrated in Fig. 14 to its rearmost position, as shown in Fig. 12, the piston valve 248 is shifted in the direction of arrow 250 (Fig. 16) to its foremost position against the tension of the coil spring 282 by means of the actuating lever 286 and actuating rod 283. When the piston valve 248 arrives at its foremost position, the inlet port 253 of the control valve housing 242 is closed and communication between the inlet port 252 and port 271 and flexible conduit 273 is established by means of the annular groove 249 so that the hydraulic actuating fluid is now admitted into the front end of the cylinder 276 and forces piston 277 in the direction of arrow 334 (Fig. 14) from its foremost position, shown in Fig. 14, to its rearmost position, illustrated in Fig. 12. When the piston valve 248 is disposed in its foremost position, the port 272 and flexible conduit 274 are connected to the return conduits 263 and 264 by means of the passages 270 and 262 so that during the actuation of the piston 277 from its position shown in Fig. 14 to its position illustrated in Fig. 12 the hydraulic actuating fluid is discharged from the rear end of the cylinder 276 into the transmission casing 177. If the operator does not release the control rod 294 when the piston 277 reaches its rearmost position (Fig. 12), the continued operation of pump 256 increases the pressure exerted by the actuating fluid causing opening of the by-pass valve 268 so that the liquid is by-passed over conduits 267, 264 back into the transmission casing 177.

Upon movement of the piston 277 in the direction of arrow 334 (Fig. 14), lever 297, shaft 298, and crank lever 302, as well as links 304, 306, 308, lever 311, shaft 164, and crank 163, are returned from their positions shown in Fig. 14 to their positions illustrated in Fig. 12 whereby the upward pull on the control rod 162 and the forward pull on the cable 120 is released and the mower unit B and crusher unit C are lowered under their own weight to operative position in a manner as will be obvious to those skilled in the art. The extent of the pivotal movement of the crank 163 limits the downward movement of the mower unit B so that the same is disposed in proper operative position above the ground with the inner and outer guide shoe of the mower riding along the same. The extent of downward movement of the crusher unit is limited by the tension of the spring 129 (Fig. 21) which carries the weight of the crusher unit by means of cable 128. The tension of the spring 129 is so adjusted as to hold the crusher unit in such lowered position that the pick-up fingers of the pick-up mechanism F are held in proper pick-up position above the ground.

From the above it will, therefore, be apparent that by shifting the control rod 294 either forward or rearward, the mower unit B and crusher unit C may be simultaneously raised or lowered to inoperative or operative position, respectively, by means of the hydraulic actuating mechanism hereinbefore described.

However, when the mower and crusher unit are disposed in their lowered or operative position, manual raising of the mower unit B independent of the crusher unit C may be effected by shifting the manual control lever 318 from its position shown in Fig. 12 to its position illustrated in Fig. 13 after the spring actuated locking rod 326 has been disengaged from locking engagement with the side 323ᵃ of the quadrant 323. When this manual control lever 318 is shifted in this manner, it engages the pin 319 of the lever 311 (Fig. 15) and swings the lever 311 from the position shown in Fig. 12 to the position illustrated in Fig. 13. This effects a corresponding rotation of the crank shaft 164 and crank 163 exerting an upward pull on the control rod 162 whereby the mower unit B is raised to inoperative position in the same manner as previously described. The tension spring 313, previously referred to, materially assists the manual raising of the mower unit. Upon movement of the control lever 318 to its forward position, the spring actuated locking rod 326 is released so that the lower end thereof engages the notch 324 of the quadrant 323 and the lever 318 is firmly locked in its foremost position.

This manual actuation of levers 318 and 311 does not in any way effect the hydraulic actuating mechanism since the link 308, pivoted at 309 to lever 311 and at 307 to the links 304, and 306, is merely shifted in a backward and upward direction from its position in Fig. 12 to its position in Fig. 13 while the links 304 and 306 pivot relative to lever 297 about pivot 303 connecting the same therewith. No forward pull is, therefore, exerted on the lever 297, as will be apparent from Figs. 12 and 13. To again lower the mower unit B the manual control arm 318 is swung from the position shown in Fig. 13 to the position illustrated in Fig. 12 whereby the reversal of the above described operation takes place and the mower unit B is lowered under its own weight to operative position.

Beside the upward movement of the mower unit B to inoperative position either by means of the hydraulic actuating mechanism or the manual control lever 318, the cutter bar assembly 140 may be manually swung from its horizontal position, as shown in Fig. 1, to vertical position, as illustrated in Fig. 2, about pivots 145 and 146. When disposed in vertical position, the cutter bar assembly is locked in position by means of a transport rod 336, pivotally connected at one end to tubular member 81 (Fig. 21) while the other free end of the rod is inserted through hole 337 (Fig. 1) of the cutter bar 140 and is attached to the bar by means of a crank nut 338 threadedly secured to the free end of the rod 336. When the cutter bar 140 is lowered to operative position the transport bar is carried on the member 81 by a clip 337ᵃ.

From the foregoing it is, therefore, apparent that when the harvesting machine is in transporting position the frame A, mower unit B, and crusher unit C are held in angularly disposed trail-behind relation with respect to the tractor E, as previously described herein and as clearly illustrated in Fig. 2. The mower unit B and crusher unit C are held in raised or inoperative position and the mowing assembly 140 is vertically disposed as shown in Fig. 2 and secured to the frame in this position by means of the transport rod 336. Consequently, with the units arranged in transporting position the width of the machine is materially reduced so that the same may be conveniently transported from one location to another along roads, over bridges, and through gates.

When the machine arrives at the location where it is to be used, the transport or tie rod 336 is disconnected, the mower assembly 140 is manually swung to horizontal position, and thereupon the transport bar 51 is removed and the tractor is backed up until the frame A is firmly locked in operative position against lateral articulation with respect to the tractor E, as shown in Fig. 1 in the manner as previously specifically described herein. This disposes the mower unit B, as well as the crusher unit C, in working position, i. e., at right angles to the line of travel of the tractor E. The machine is then maneuvered into position in the field for cutting the first swath of alfalfa and the power take off 191 of the tractor E is set in operation whereby the various units and the pump 256 are driven by means of the power take off shaft 189. The operator then shifts the control rod 294 to its rearmost position whereby the mower unit B and crusher unit C are lowered to operative position. As the tractor is now driven along the field, the alfalfa is cut by the mowing unit B then picked up by the pick-up mechanism F and introduced into the crusher unit C which crushes the stems of the alfalfa and subsequently discharges the treated alfalfa back onto the ground for subsequent drying.

When it is desired to turn the machine, the control rod 294 is shifted to its forward position whereby the mower unit B and crusher unit C are hydraulically raised to inoperative position in the manner as heretofore specifically described so that the machine may be turned without any danger of the mower knife or pick-up fingers striking an obstruction. If the operator desires only to raise the mowing unit B, this may be accomplished by actuating the manual control lever 318 in the manner as heretofore described, so that the machine may be used for picking up alfalfa which already has been previously cut.

In this way, the mower and crusher unit may be raised and lowered as the conditions require for maneuvering the machine into proper position for cutting and treating the alfalfa in successive swaths.

During the operation of the machine, the same is free to pivot in vertical direction about the pivots 15 and 16 relative to the tractor E so that the harvesting machine may closely follow any unevenness of the ground. Likewise, the auxiliary frame 2, the truss bar assembly 3, as well as the crusher unit C carried thereby may freely pivot in vertical direction about the pivots 63 and 87 so that the crusher unit C and the pick-up mechanism F thereof may closely follow the contour of the ground. Due to suspension of the crusher unit C on the truss bar structure 3 in balanced position, most of the load is taken off arms 91 and 92 and the lift shaft 95 so that the crusher unit is floatingly supported with the pick-up fingers F in contact with the cut alfalfa on the field. This permits a considerably faster operation of the machine than has heretofore been possible without any likelihood of injury to the pick-up mechanism.

In view of the particular hitch mechanism between the harvesting machine and tractor, as specifically described in the above, any lateral pivotal movement of the harvesting machine relative to the tractor is prevented and this enables short turning of the tractor and harvesting machine at the corners of the field so that a cutting of the alfalfa at the corners of the field in swaths disposed at right angles to each other is greatly facilitated.

While I have shown and described a preferred embodiment of the present invention, it will be understood that various changes and modifications may be made without departing from the spirit of the invention and the scope of the appended claims.

Having thus described the present invention and the manner in which the same is to be used, what I claim as new and desire to protect by Letters Patent is:

1. A coupling mechanism for connecting a harvesting machine frame to a tractor for controlled lateral pivotal movement between working and transporting positions relative thereto, comprising a movable latch member secured to said tractor and a latch engaging means on said frame for locking said harvesting machine in working position against lateral pivotal movement relative to the tractor, manually controlled means on said tractor for engaging and releasing said latch member to permit lateral pivotal movement of the machine relative to the tractor into transporting position when the tractor is driven in forward direction, and means operatively associated with said tractor and harvesting machine frame for locking the machine in transporting position against lateral pivotal movement relative to the tractor when said latch member is disengaged.

2. Mechanism for attaching a harvesting unit having a crop engaging portion thereon to a tractor, comprising a frame coupled to said unit and to the tractor for vertical and lateral movement of the frame relative to the tractor, a movable spring-actuated latch member on the tractor and a latch engaging means on said frame for locking said frame to the tractor for preventing lateral movement therebetween when the crop engaging portion of the harvesting unit is disposed at substantially right angles to the line of travel of the tractor, movable means on the tractor for releasing said latch member to free the frame for lateral movement relative to the tractor thereby to move the harvesting unit into trailing transporting position with the crop engaging portion of the harvesting unit disposed at an obtuse angle to the longitudinal center line of the tractor to which the frame is coupled, and means operatively associated with said tractor and harvesting unit for locking said frame to retain the harvesting unit in said transporting position against lateral movement relative to the tractor when said latch member is disengaged.

3. Mechanism for connecting a harvesting unit having an outboard support wheel swiveled thereon to a tractor, said mechanism comprising a frame pivotally connected at one side thereof to the tractor, latch means mounted at the other side of said frame from its pivotal connection to the tractor to releasably secure said frame against pivotal movement about said pivotal connection relative to the tractor, means for connecting the harvesting unit to said frame to extend laterally therefrom, a support truss extending over the harvesting unit and connected to said frame, said truss being connected at one end to said frame and connected at its other end to the harvesting unit adjacent its outboard support wheel, and biased counter-balancing support means carried by said truss and connected to a portion of the harvesting unit to transmit weight thereof through said truss to the outboard support wheel and through said frame to the tractor.

4. Mechanism for connecting a harvesting unit having an outboard support wheel swiveled thereon to a tractor, comprising an elongated frame, hinge means mounted along one side of said frame for hinged connection to the harvesting unit for relative up and down movement, hinge means mounted along the forward end of said frame for connection to the tractor for relative up and down movement, means forming a pivotal connection on the opposite side of said frame from said first hinge means, releasable latch means on the same side of said frame as said first hinge means, controlled latch release means on the tractor for freeing said latch means thereby to free said frame and the harvesting unit hingedly connected thereto for lateral swinging movement relative to the tractor about said pivotal connection, a truss having one end thereof connected to the harvesting unit adjacent its outboard support wheel, the other end of said truss being connected to said frame, and counterbalancing support means carried by said truss and depending from an intermediate portion thereof for connection to the harvesting unit to support the weight thereof.

JAMES M. MARTIN.

REFERENCES CITED

The following references are of record in the file of this patent:

UNITED STATES PATENTS

| Number | Name | Date |
|---|---|---|
| 1,972,680 | Cushman | Sept. 4, 1934 |
| 1,992,429 | Hyman | Feb. 26, 1935 |
| 2,004,213 | Paul | June 11, 1935 |
| 2,114,580 | Thompson | Apr. 19, 1938 |
| 2,310,388 | Blair | Feb. 9, 1943 |
| 2,311,859 | Oehler | Feb. 23, 1943 |
| 2,331,863 | Schroeppel | Oct. 12, 1943 |
| 2,345,715 | Reed | Apr. 4, 1944 |
| 2,347,907 | Hill | May 2, 1944 |
| 2,410,918 | Acton | Nov. 12, 1946 |